United States Patent
Wang et al.

(10) Patent No.: US 11,669,180 B2
(45) Date of Patent: *Jun. 6, 2023

(54) TOUCH DISPLAY SUBSTRATE AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Zhen Wang, Beijing (CN); Yun Qiao, Beijing (CN); Jian Sun, Beijing (CN); Xiaozhou Zhan, Beijing (CN); Jun Fan, Beijing (CN); Jianjun Zhang, Beijing (CN); Cheng Li, Beijing (CN); Hailin Xue, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,179

(22) Filed: Oct. 1, 2021

(65) Prior Publication Data
US 2022/0019308 A1 Jan. 20, 2022

Related U.S. Application Data

(63) Continuation of application No. 16/621,401, filed as application No. PCT/CN2018/098988 on Aug. 6, 2018, now Pat. No. 11,163,389.

(30) Foreign Application Priority Data

Aug. 10, 2017 (CN) .......................... 201710681837.0

(51) Int. Cl.
*G06F 3/041* (2006.01)

(52) U.S. Cl.
CPC .. *G06F 3/0412* (2013.01); *G06F 2203/04103* (2013.01)

(58) Field of Classification Search
CPC .................. G06F 3/0412; G06F 2203/04103
See application file for complete search history.

(56) References Cited

U.S. PATENT DOCUMENTS 11,163,389 B2 * 11/2021 Wang .................... G06F 3/0412
2005/0156849 A1    7/2005 Sun
(Continued)

FOREIGN PATENT DOCUMENTS

| CN | 104698709 A | 6/2015 |
| CN | 104808403 A | 7/2015 |

(Continued)

OTHER PUBLICATIONS

Extended European Search Report dated Mar. 30, 2021 corresponding to European Patent Application No. 18842965.8; 7 pages.
(Continued)

*Primary Examiner* — Stephen G Sherman
(74) *Attorney, Agent, or Firm* — Leason Ellis LLP

(57) ABSTRACT

A touch display substrate and a display device are provided. The touch display substrate includes a plurality of sub-pixel units (10), data lines (20) and touch signal lines (30). For any two adjacent rows of sub-pixel units, the sub-pixel unit (10) in one row of sub-pixel units is staggered in a row direction with respect to the sub-pixel unit (10) in the other row of sub-pixel units adjacent to the one row of sub-pixel units by a distance of X sub-pixel units (10), and 0<X<1; these two sub-pixel units (10) have different colors. Data lines (20) and touch signal lines (30) are at gaps which extend in a column direction and are between the plurality of sub-pixel units
(Continued)

(10). The touch signal lines (30) and the data lines (20) are in a same layer and the touch signal lines (30) are insulated from the data lines (20).

9 Claims, 14 Drawing Sheets

(56) References Cited

U.S. PATENT DOCUMENTS

| | | |
|---|---|---|
| 2014/0049503 A1 | 2/2014 | Cok |
| 2015/0062468 A1 | 3/2015 | Hu |
| 2016/0370919 A1 | 12/2016 | Xu et al. |
| 2017/0160602 A1 | 6/2017 | Yang et al. |

FOREIGN PATENT DOCUMENTS

| | | |
|---|---|---|
| CN | 104951143 A | 9/2015 |
| CN | 105047123 A | 11/2015 |
| CN | 105652498 A | 6/2016 |
| CN | 105845033 A | 8/2016 |
| CN | 205507719 U | 8/2016 |
| CN | 205680370 U | 11/2016 |
| CN | 106502474 A | 3/2017 |
| CN | 106773421 A | 5/2017 |
| CN | 106908980 A | 6/2017 |
| CN | 106909249 A | 6/2017 |
| CN | 107506076 A | 12/2017 |
| EP | 2521014 A2 | 11/2012 |

OTHER PUBLICATIONS

Chinese Office Action dated Nov. 20, 2018 corresponding to Chinese Patent Application No. 201710681837.0; 16 pages.

Notice of Allowance for related U.S. Appl. No. 16/621,401, dated Jul. 6, 2021. 5 pages.

Non-Final Rejection for related U.S. Appl. No. 16/621,401, dated Jan. 8, 2021. 18 pages.

* cited by examiner

TOUCH DISPLAY SUBSTRATE AND DISPLAY DEVICE

CROSS-REFERENCE TO RELATED PATENT APPLICATIONS

The present is a Continuation Application of U.S. application Ser. No. 16/621,401, filed on Dec. 11, 2019, which is a U.S. National Stage Application under 35 U.S.C. § 371 of International Patent Application No. PCT/CN2018/098988, filed Aug. 6, 2018, which claims the benefit of Chinese patent application No. 201710681837.0 filed on Aug. 10, 2017, all of which are incorporated by reference in their entireties as a part of the present application.

TECHNICAL FIELD

Embodiments of the present disclosure relate to a touch display substrate and a display device.

BACKGROUND

A touch display panel is a display device with both display and command input functions. A user interacts the touch display panel with a hand or an object, which is detected in a touch region of the touch display panel, and the touch display panel makes a corresponding response according to the detected touch region. Among many kinds of touch display panels, in-cell touch display panels, in which touch electrodes are embedded inside a display panel, have features such as thin thickness and low cost, and thus are favored by major panel manufacturers.

In order to meet the touch accuracy, in the touch display panel, it is generally necessary to provide a plurality of touch electrodes inside the display panel, and each touch electrode needs to be provided with a corresponding touch signal line. However, the arrangement of the touch signal lines is complex and still needs to be increased.

SUMMARY

According to the embodiments of the present disclosure, a touch display substrate is provided. The touch display substrate includes a plurality of sub-pixel units arranged in an array. For any two adjacent rows of sub-pixel units, the sub-pixel units in one row of sub-pixel units are staggered in a row direction with respect to the sub-pixel units in the other row of sub-pixel units adjacent to the one row of sub-pixel units by a distance of X sub-pixel units, 0<X<1, each sub-pixel unit in the one row of sub-pixel units has a color different from that of the sub-pixel unit, which is adjacent to the each sub-pixel unit and is in the other row of sub-pixel units, and each of the plurality of sub-pixel units includes a pixel unit switch. The touch display panel further includes: data lines, at gaps which extend in a column direction and are between the plurality of sub-pixel units; and touch signal lines, at the gaps which extend in the column direction and are between the plurality of sub-pixel units. The touch signal lines and the data lines are in a same layer and the touch signal lines are insulated from the data lines.

For example, the pixel unit switch includes an active layer, the active layer includes a source region, a drain region and a channel region between the source region and the drain region, the active layer is in a layer different from the layer where the data lines and the touch signal lines are located, and the source region is electrically connected with the data line through a via hole; the data lines include a first data line, and the touch signal line is at the gap, where the first data line is located, extending in the column direction; the pixel unit switches of the plurality of pixel units include a first pixel unit switch connected with a first side of the first data line; and a projection of the touch signal line in a direction perpendicular to the touch display substrate is between the source region and the drain region of the first pixel unit switch.

For example, the pixel unit switches include a second pixel unit switch connected with a second side of the first data line, and the first side and the second side are opposite sides of the first data line; a distance between the source region and the drain region of the first pixel unit switch in the row direction is greater than a distance between the source region and the drain region of the second pixel unit switch in the row direction.

For example, a first distance is greater than a second distance, the first distance is a distance in the row direction between two of the data lines closest to a same touch signal line among the touch signal lines, and the second distance is a distance in the row direction between any two adjacent ones of the data lines between two adjacent ones of the touch signal lines.

For example, the data lines further include a second data line, and the touch signal line is not at the gap, where the second data line is located, extending in the column direction; and the two of the data lines closest to the same touch signal line include one first data line and one second data line, and a distance in the row direction and between the touch signal line and the second data line in the two of the data lines closest to the same touch signal line is equal to the second distance.

For example, each of the plurality of sub-pixel units includes a pixel unit electrode, and the drain region is electrically connected with the pixel unit electrode; in two columns of the plurality of sub-pixel units closest to the same first data line, a distance in the row direction and between the first data line and the pixel unit electrode of the sub-pixel unit on the first side of the first data line is greater than a distance in the row direction and between the first data line and the pixel unit electrode of the sub-pixel unit on a second side of the first data line, the first side and the second side are opposite sides of the first data line, and the first pixel unit switch is in the sub-pixel unit on the first side of the first data line.

For example, the active layer includes a horizontal portion extending in the row direction; the touch display substrate further includes a gate line at a gap extending in the row direction between the plurality of sub-pixel units; and a projection of the horizontal portion in the direction perpendicular to the touch display substrate partially overlaps a projection of the gate line in the direction perpendicular to the touch display substrate.

For example, the active layer includes a vertical portion extending in the column direction; a projection of the vertical portion of the active layer of the first pixel unit switch in the direction perpendicular to the touch display substrate is within the projection of the touch signal line in the direction perpendicular to the touch display substrate.

For example, the active layer includes a vertical portion extending in the column direction; a projection of the vertical portion of the active layer of the first pixel unit switch in the direction perpendicular to the touch display substrate is within a projection of the first data line in the direction perpendicular to the touch display substrate.

For example, an extending direction of the first data line is consistent with an extending direction of the touch signal line, and a distance between the first data line and the touch signal line is equal everywhere.

For example, each of the data lines at the gaps which are provided with the touch signal lines and extend in the column direction includes a convergence line and two branch lines both connected with the convergence line, the touch signal line is between the two branch lines, one of the two branch lines is connected with the pixel unit switch on a first side of the touch signal line, the other of the two branch lines is connected with another pixel unit switch on a second side of the touch signal line, and the first side and the second side are opposite sides of the touch signal line.

For example, two ends of the one of the two branch lines are respectively connected with two ends of the other of the two branch lines to form a closed frame structure, the touch signal line is inside the frame structure, and the convergence line is connected with the frame structure.

For example, the pixel unit switch is a low-temperature polysilicon type thin film transistor.

For example, each data line of the data lines is connected with the pixel unit switches of the sub-pixel units which are respectively on two sides of the each data line in the row direction and are respectively in different rows.

For example, each of the data lines is connected with the pixel unit switches of the sub-pixel units of the same color.

For example, only the sub-pixel units of two different colors are between any two adjacent ones of the data lines.

For example, the sub-pixel units in two rows of the sub-pixel units spaced apart from each other by one row of the sub-pixel units are aligned in the column direction.

For example, the touch display substrate according to the embodiment of the present disclosure further includes touch detection electrodes, where the touch detection electrodes are connected with the touch signal lines, respectively.

For example, the touch detection electrodes are further configured to be used as a common electrode layer of the plurality of sub-pixel units.

According to the embodiments of the present disclosure, a display device is further provided. The display device includes the touch display substrate as described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
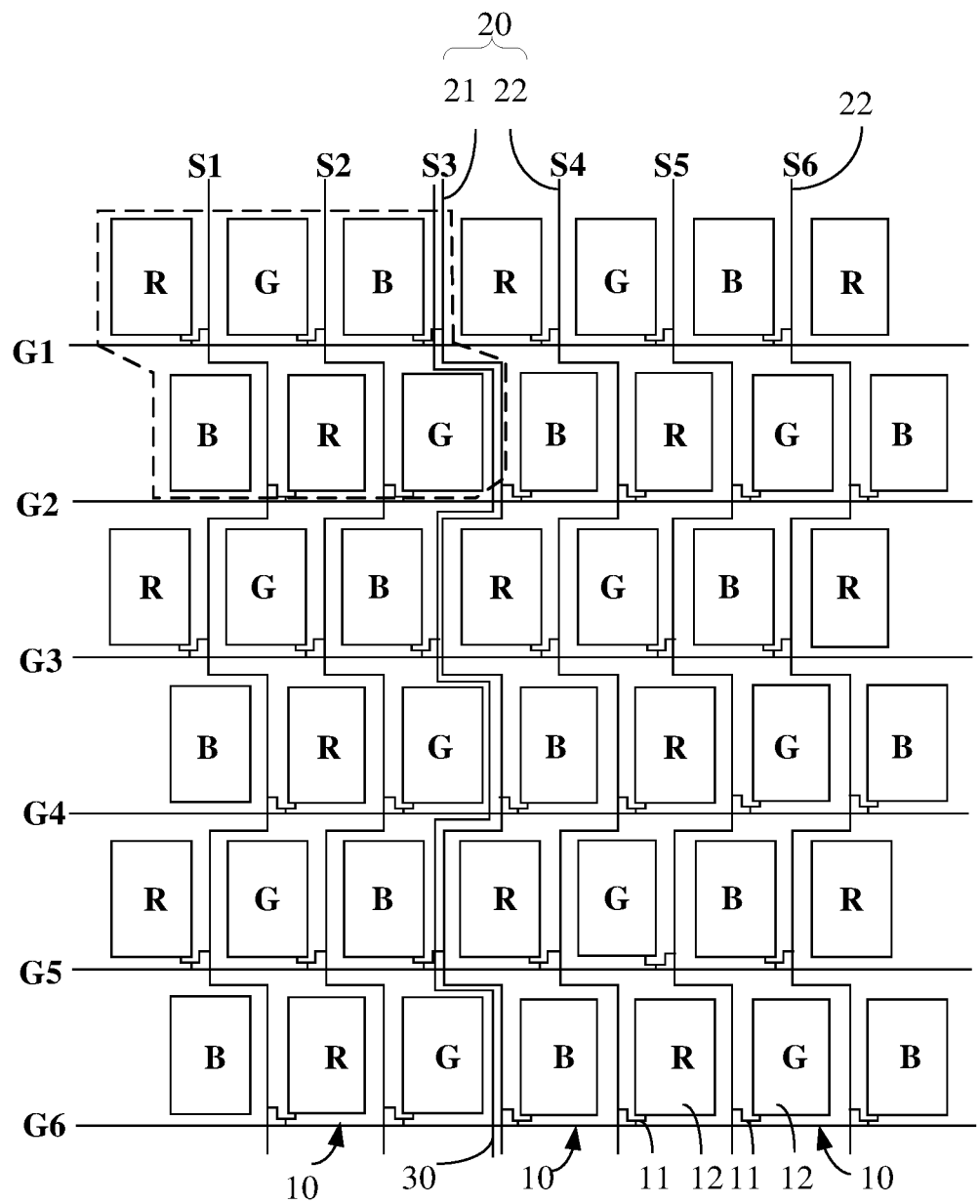
FIG. 1 is a partial plan view of a touch display substrate provided by the embodiments of the present disclosure.

FIG. 1 is a partial structural schematic view of a touch display substrate provided by the embodiments of the present disclosure. As shown in FIG. 1, the touch display substrate includes a plurality of sub-pixel units 10 arranged in an array, a plurality of data lines 20, a plurality of touch signal lines 30 (only one of which is shown in FIG. 1 as an example), and a plurality of touch detection electrodes (not shown in FIG. 1).

For example, as shown in FIG. 1, the sub-pixel units 10 in each row of sub-pixel units are aligned; for any two adjacent rows of sub-pixel units, the sub-pixel units 10 in one row of sub-pixel units are staggered in a row direction with respect to the sub-pixel units 10 in the other row of sub-pixel units adjacent to the one row of sub-pixel units 10 by a distance of X sub-pixel units 10, and 0<X<1. For example, X is 0.5. For any two adjacent rows of sub-pixel units, the sub-pixel unit in one of the two adjacent rows of sub-pixel units has a color different from that of the sub-pixel unit, which is adjacent to this sub-pixel unit and is in the other row of sub-pixel units. Each sub-pixel unit 10 includes a pixel unit switch 11 and a pixel unit electrode 12. Each data line 20 is provided at a gap extending in a column direction and between the sub-pixel units 10. For example, each data line 20 is connected with the pixel unit switches 11 of the sub-pixel units 10 which are in different rows. For example, each data line 20 is connected with the pixel unit switches 11 in the sub-pixel units 10 which are respectively provided at two sides of the data line 20 in the row direction and are in the different rows. Each touch signal line 30 is provided at the gap extending in the column direction and between the sub-pixel units 10. Because the number of the touch signal lines 30 is smaller than the number of the data lines 20, not every gap extending in the column direction and being provided with the data line 20 is provided with one touch signal line 30; in this case, for example, the data lines 20 include first data lines 21 and second data lines 22, the gap extending in the column direction and being provided with the first data line 21 is provided with the touch signal line 30, and the gap extending in the column direction and being provided with the second data line 22 is not provided with the touch signal line 30. The touch signal lines 30 and the data lines 20 are in a same layer and the touch signal lines 30 are insulated from the data lines 20.

For example, as shown in FIG. 1, the touch display substrate further includes a plurality of gate lines G1, G2, . . . Gn that intersect the plurality of data lines 20 to define the plurality of sub-pixel units 10 as described above. For example, each gate line is provided at a gap extending in the row direction and being between the sub-pixel units and is connected with the sub-pixel units 10 in the same row.

For example, the pixel unit switch 11 is a TFT (thin film transistor). For example, the TFT includes a gate electrode 113 and an active layer; the active layer includes a source region 112, a drain region 111 and a channel region 114 which is between the source region 112 and the drain region 111; the source region 112 and the drain region 111 are regions electrically connected with the data line 20 and the pixel unit electrode 12 respectively, and are regions which are doped to allow the conductivity of the regions to be larger than that of the channel region 114, for example. FIG. 2($a$) is a partially enlarged schematic view of FIG. 1 (for convenience of explanation, only components such as the data lines, the touch signal lines, the active layers, the pixel unit electrodes and the like are shown, and other components such as touch electrodes, insulating layers between layers and the like are not shown). As shown in FIGS. 1 and 2($a$), the active layer is in a layer different from the layer where the data lines 20 and the touch signal lines 30 are located, the source region 112 is electrically connected with the data line 20 through a via hole 101, and the drain region 111 is electrically connected with the pixel unit electrode 12 through a via hole 102. For example, the TFT is a top gate type TFT or a bottom gate type TFT, and the embodiments of the present disclosure are not limited thereto.

The pixel unit switches 11 includes first pixel unit switches 11$a$ and second pixel unit switches 11$b$. The first pixel unit switch 11$a$ is connected with a first side of the first data line 21 (e.g., a left side of the first data line 21 shown in FIG. 2($a$)), the second pixel unit switch 11$b$ is connected with a second side of the first data line 21 (e.g., a right side of the first data line 21 shown in FIG. 2($a$)), and the first side and the second side are opposite sides of the first data line 21. A projection of the touch signal line 30 in a direction perpendicular to the touch display substrate is located between the source region and the drain region of the first pixel unit switch 11$a$, that is, an orthographic projection of the touch signal line 30 on the base substrate 1 is located between an orthographic projection of the source region of the first pixel unit switch 11$a$ on the base substrate 1 and an orthographic projection of the drain region of the first pixel unit switch 11$a$ on the base substrate.

For example, a distance $d_1$ in the row direction between the source region 112 and the drain region 111 of the first pixel unit switch 11$a$ is larger than a distance $d_2$ in the row direction between the source region 112 and the drain region 111 of the second pixel unit switch 11$b$. This makes it easy to arrange the touch signal line 30.

For example, the TFT is a low-temperature polysilicon type TFT, which has more advantages than an amorphous silicon type TFT. FIG. 3 is a schematic cross-sectional view take along line A-A in FIG. 2($a$). In combination with FIGS. 2($a$) and 3, the TFT includes the gate electrode 113 provided on the base substrate 1, a gate insulating layer 2 provided on the gate electrode 113, and the active layer provided on the gate insulating layer 2. The gate insulating layer 2 is, for example, formed of silicon oxide or silicon nitride, and has a thickness of, for example, 80 nm to 120 nm. The active layer has the drain region 111 and the source region 112 which are spaced apart from each other and has the channel region 114 located between the drain region 111 and the source region 112. The orthographic projection of the drain region 111 and the orthographic projection of the source region 112 on the base substrate 1 is located outside an orthographic projection of the gate electrode 113 on the base substrate 1, and an orthographic projection of the channel region 114 on the base substrate 1 coincides with the orthographic projection of the gate electrode 113 on the base substrate 1. The electron mobility of the low-temperature polysilicon is much larger than that of the amorphous silicon, so the active layer is made longer and narrower in the low-temperature polysilicon type TFT to increase the distance between the drain region 111 and the source region 112 of the first pixel unit switch 11$a$, and to facilitate the arrangement of the touch signal line 30.

As shown in FIG. 3, the plurality of touch signal lines 30 and the plurality of data lines 20 are provided in the same layer and the plurality of touch signal lines 30 are insulated from the plurality of data lines 20.

For example, a first insulating layer 3 is provided on the layer where the TFT is located, and a material of the first insulating layer 3 includes nitride or nonmetallic oxide, the nitride includes but is not limited to SiNx, and the nonmetallic oxide includes but is not limited to SiOx. The first insulating layer 3 is provided between the layer where the TFT is located and the layer where the plurality of touch signal lines 30 and the plurality of data lines 20 are located. For example, as shown in FIG. 3, a via hole 101 passes through the first insulating layer 3.

The plurality of touch detection electrodes 31 are connected with respective corresponding touch signal lines 30. For example, the touch detection electrode 31 is electrically connected with the corresponding touch signal line 30 through the via hole 103. A second insulating layer 4 is, for example, provided between the layer where the touch signal line 30 is located and a layer where the touch detection electrode 31 is located to planarize the surface of the layer. For example, a material of the second insulating layer 4 is resin. For example, as shown in FIG. 3, the via hole 103 passes through the second insulating layer 4.

For example, a third insulating layer 5 is provided between the layer where the touch detection electrode 31 is located and a layer where the pixel unit electrode 12 is located. A material of the third insulating layer 5 is, for example, silicon nitride. A thickness of the third insulating layer 5 is, for example, from 100 nm to 200 nm. For example, as shown in FIG. 3, a via hole 102 passes through the first insulating layer 3, the second insulating layer 4 and the third insulating layer 5.

With reference again to FIG. 2($a$), the projection of any touch signal line 30 in the direction perpendicular to the touch display substrate is located between the source region 112 and the drain region 111 of the first pixel unit switch 11$a$. That is, the touch signal line 30 crosses directly above the first pixel unit switch 11$a$ to prevent the short circuit generating between the touch signal line 30 and the data line 20.

As shown in FIG. 2($a$), a first distance $d_3$ is greater than a second distance $d_4$, the first distance $d_3$ is a distance in the row direction between the two data lines 20 closest to the same touch signal line 30, and the second distance $d_4$ is a distance in the row direction between any two adjacent data lines 20 located between the two adjacent touch signal lines 30. Because a region between the touch signal line 30 and the first data line 21 does not emit light, setting the first distance $d_3$ larger than the second distance $d_4$ increases the area of the region that emits light under a given area of the region between the touch signal line 30 and the first data line 21.

For example, for the two columns of sub-pixel units 10 closest to the same first data line 21, a distance $d_5$ between the first data line 21 and the pixel unit electrode 12 of the sub-pixel unit 10 located on the first side of the first data line 21 is larger than a distance $d_6$ between the first data line 21 and the pixel unit electrode 12 of the sub-pixel unit 10 located on the second side of the first data line 21, and the first side and the second side are the opposite sides of the first data line 21. For example, the first pixel unit switch 11a is provided in the sub-pixel unit 10 located on the first side of the first data line 121. Because the distances between the first data line 21 and the pixel unit electrodes 12 of the sub-pixel units 10 respectively located on the two sides of the first data line 21 is not equal to each other, it is convenient to place the touch signal line 30 on the side where the distance is larger. Note that the distance between the first data line 21 and the pixel unit electrode 12 refers to the minimum distance between an edge of the first data line 21 and an edge of the pixel unit electrode 12 in the row direction.

For example, the two data lines 20 closest to the same touch signal line 30 include the first data line 21 and the second data line 22; and for the two data lines 20 closest to the same touch signal line 30, a distance $d_7$ between the second data line 22 and the touch signal line 30 in the row direction is equal to the second distance $d_4$, so that the light emitting areas of the sub-pixel units are equal to each other. The data line closest to the touch signal line means that no touch signal line or no data line is between the data line and the touch signal line. For example, in FIG. 2(a), the two data lines 20 closest to the same touch signal line 30 are the first data line 21 located on a right side of the touch signal line 30 and the first second data line 22 located on a left side of the touch signal line 30, which has nothing to do with the actual distances.

Figure 2A:
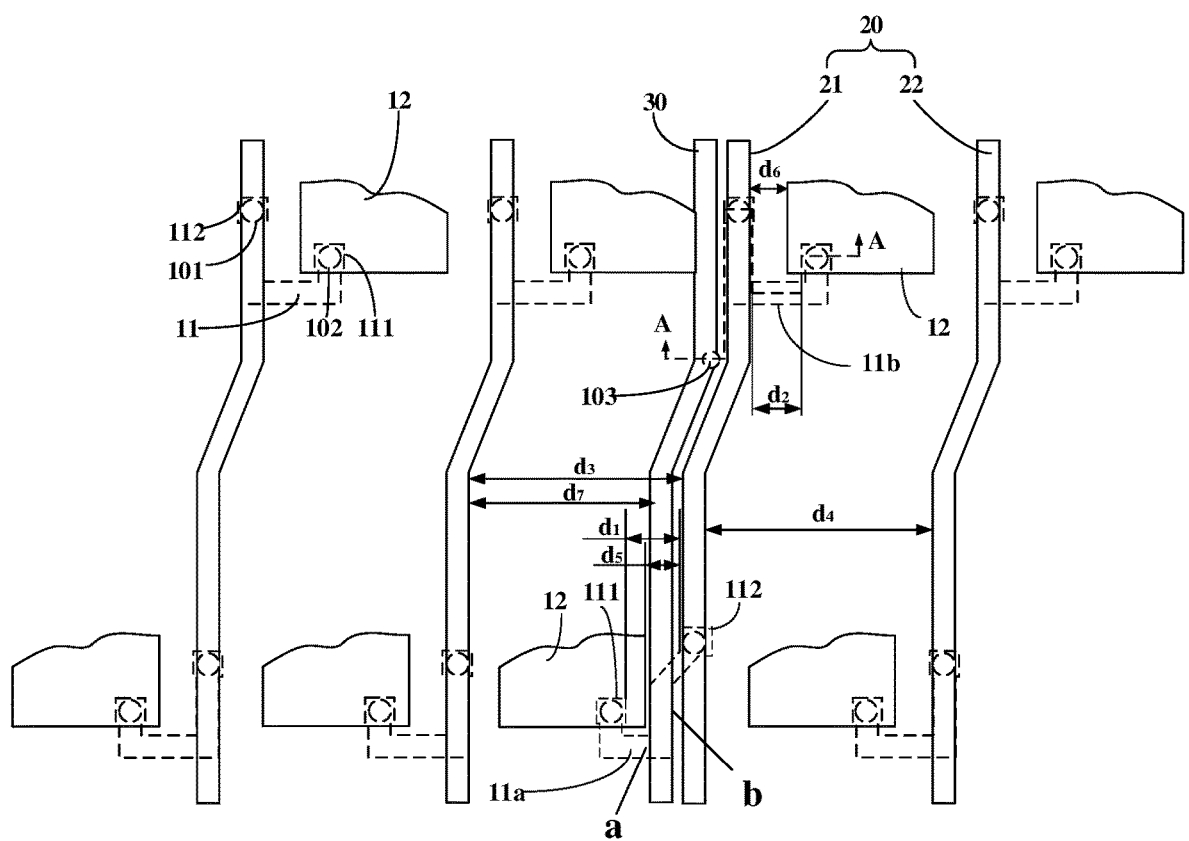
FIG. 2(a) is a partially enlarged schematic view in FIG. 1.
Figure 2B:
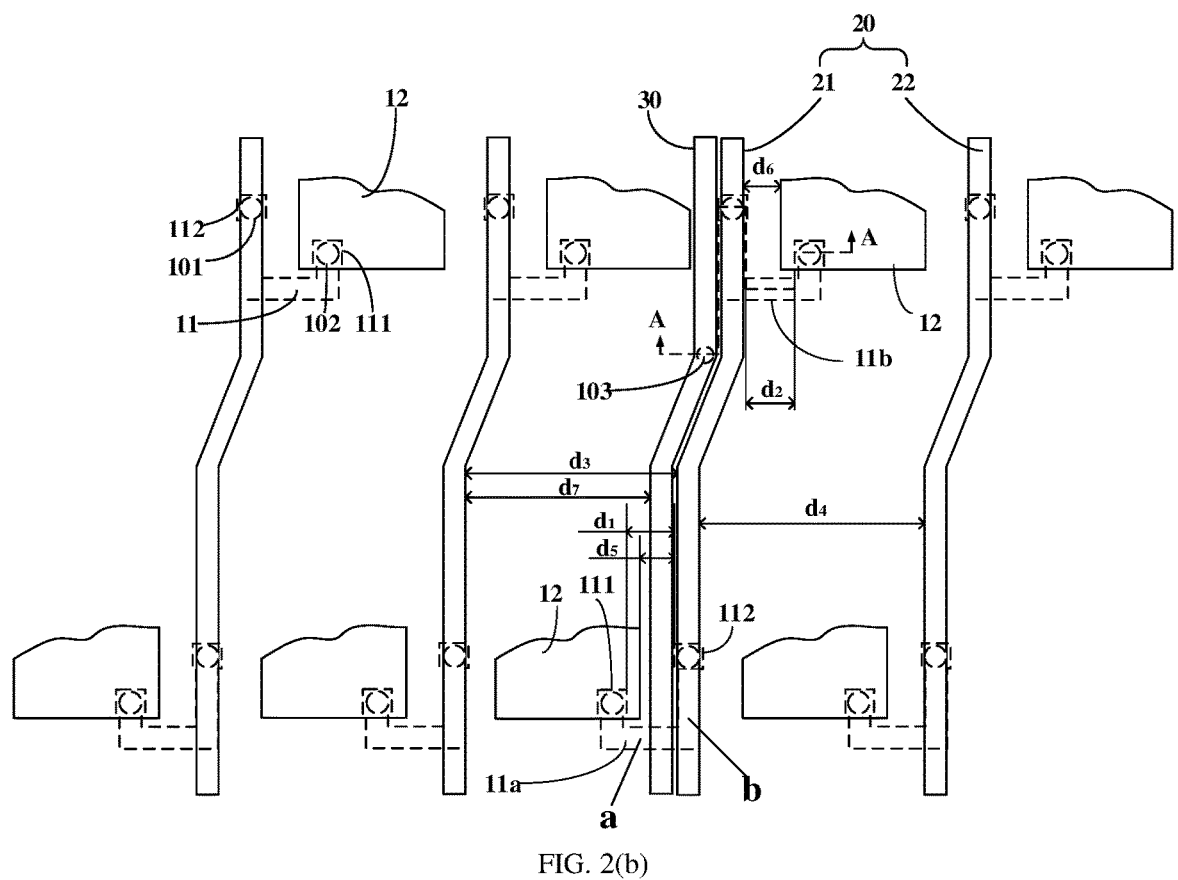
FIG. 2(b) is another partially enlarged schematic view in FIG. 1.
Figure 3:
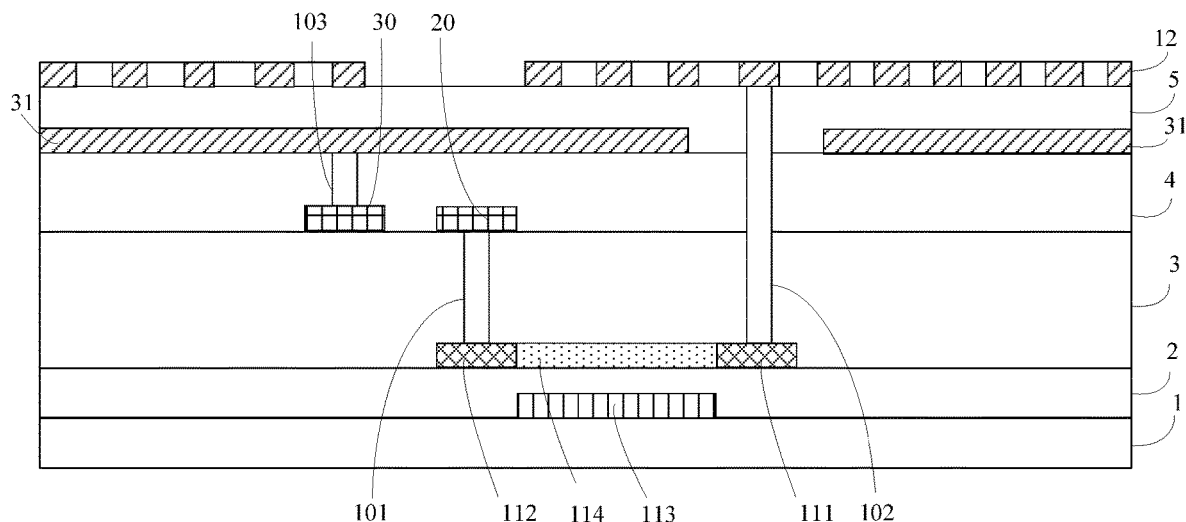
FIG. 3 is a schematic cross-sectional view taken along line A-A in FIG. 2(a)

For example, as shown in FIG. 2(a), the active layer includes a horizontal portion a extending in the row direction and a vertical portion b extending in the column direction. For example, a projection of the horizontal portion a in the direction perpendicular to the touch display substrate partially overlaps a projection of the gate line in the direction perpendicular to the touch display substrate; that is, an orthographic projection of the horizontal portion a on the base substrate 1 overlaps an orthographic projection of the gate line on the base substrate 1. In this way, a portion of the gate line is, for example, directly used as the gate electrode. For example, as shown in FIG. 2(a), for a projection of the vertical portion b of the active layer of the first pixel unit switch 11a connected with the first data line 21 in the direction perpendicular to the touch display substrate, the projection of the vertical portion b is located within the projection of the touch signal line 30 in the direction perpendicular to the touch display substrate, and the projection of the vertical portion b has a width in the row direction equal to a width in the row direction of the projection of the touch signal line 30 in the direction perpendicular to the touch display substrate; that is, for the first pixel unit switch 11a connected with the first data line 21, an orthographic projection of the vertical portion b of its active layer on the base substrate 1 is located within the orthographic projection of the touch signal line 30 on the base substrate 1, and the width of the orthographic projection of the vertical portion b on the base substrate 1 in the row direction is equal to the width of the orthographic projection of the touch signal line 30 on the base substrate 1 in the row direction. FIG. 2(b) is another partially enlarged schematic view of FIG. 1. Different from FIG. 2(a), in FIG. 2(b), for the projection of the vertical portion b of the active layer of the first pixel unit switch 11a connected with the first data line 21 in the direction perpendicular to the touch display substrate, the projection of the vertical portion b is located within the projection of the first data line 21 in the direction perpendicular to the touch display substrate, and the projection of the vertical portion b has the width in the row direction equal to the width in the row direction of the projection of the first data line 21 in the direction perpendicular to the touch display substrate; that is, for the first pixel unit switch 11a connected with the first data line 21, the orthographic projection of the vertical portion b of its active layer on the base substrate 1 is located within the orthographic projection of the first data line 21 on the base substrate 1, and the width of the orthographic projection of the vertical portion b on the base substrate 1 in the row direction is equal to the width of the orthographic projection of one first data line 21 on the base substrate 1 in the row direction. In the structure shown in FIG. 2(a), the vertical portions b of the active layers of all pixel unit switches 11 are separated by the same distance, so as to facilitate patterning. In the structure shown in FIG. 2(b), the vertical portions b of the active layers of all the pixel unit switches 11 overlap the data lines 20, so that the electrical uniformity of the touch display substrate can be increased. In the embodiments of the present disclosure, the positional relationship between the gate line and the active layer is not limited to the cases shown in FIGS. 2(a) and 2(b). For example, the gate line overlaps the vertical portion b of the active layer at two positions and the gate line does not overlap the horizontal portion a of the active layer, thereby forming a double gate TFT.

For example, the plurality of touch detection electrodes 31 form a common electrode layer of the sub-pixel units. In this case, the touch detection electrodes 31 are also used as the common electrode layer of the sub-pixel units 10, which is advantageous for reducing the thickness of the display substrate.

For example, as shown in FIG. 3, the data line 20 and the touch signal line 30 are located between the layer where the active layer 14 is located and the common electrode layer.

Figure 4:
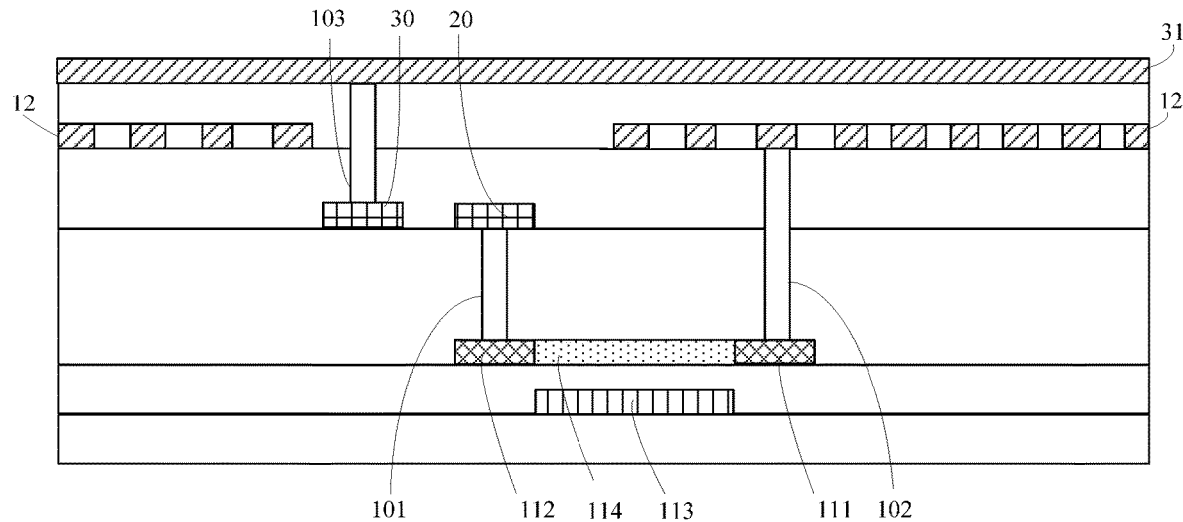
FIG. 4 is another schematic cross-sectional view of the touch display substrate provided by the embodiments of the present disclosure.

FIG. 4 is another schematic partial cross-sectional view of the touch display substrate provided by the embodiments of the present disclosure. The structure of the touch display substrate shown in FIG. 4 is basically the same as that of the touch display substrate shown in FIG. 3, except that the pixel unit electrode 12 of the touch display substrate in FIG. 4 is located below the touch detection electrode 31.

Figure 5:
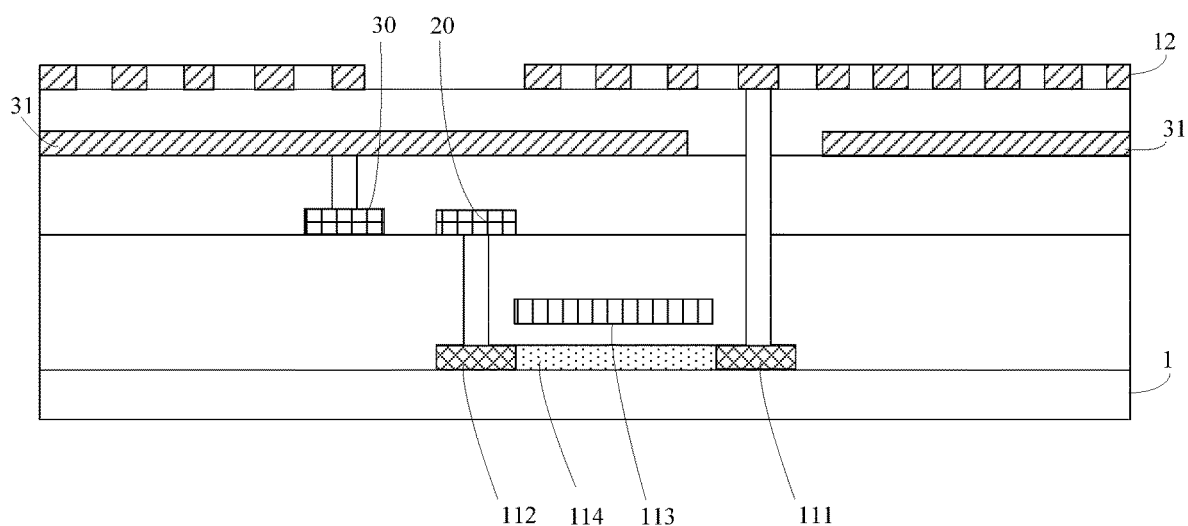
FIG. 5 is still another schematic cross-sectional view of the touch display substrate according to the embodiments of the present disclosure.

FIG. 5 is another schematic partial cross-sectional view of the touch display substrate provided by the embodiments of the present disclosure. The structure of the touch display substrate shown in FIG. 5 is basically the same as that of the touch display substrate shown in FIG. 3, except that the pixel unit switch in the touch display substrate shown in FIG. 5 is a top gate type TFT.

It should be noted that a light shielding layer facing the channel region 114 is provided between the base substrate 1 and the active layer 114 in the manufacturing process of the top gate type TFT, to prevent a photo-generated leakage current, and the light shielding layer is not shown in FIG. 5.

By arranging the touch signal line and the data line in the same layer, the parasitic capacitance between the data line and the touch signal line is reduced, an insulating layer between the data line and the touch signal line is omitted, and the process is simplified. Meanwhile, the touch signal line and the data line are insulated from each other to avoid short circuit between the touch signal line and the data line.

As shown in FIG. 1, the sub-pixel units 10 in the two rows of sub-pixel units 10 spaced apart from each other by one row of sub-pixel units are aligned in the column direction, so that the sub-pixel units 10 are arranged more orderly and are convenient to be manufactured.

It can be contemplated that in other embodiments, the sub-pixel units 10 in the two rows of sub-pixel units 10 spaced apart from each other by one row of sub-pixel units may also be arranged out of alignment in the column direction to meet different needs. For example, in a triangular touch display substrate, the sub-pixel units 10 in two rows of sub-pixel units 10 spaced apart from each other by one row of sub-pixel units are retracted into a distance of several sub-pixel units 10 row by row in the column direction. For example, in the touch display substrate of other possible shape which includes but is not limited to a circle, a rhombus, an oval and a trapezoid, the sub-pixel units 10 in two rows of sub-pixel units 10 spaced apart from each other by one row of sub-pixel units are, for example, retracted or extended by a distance of several sub-pixel units 10 in the column direction, so that the pixel units are arranged in the shape of the display substrate.

In the embodiments of the present disclosure, for example, any row of sub-pixel units 10 includes sub-pixel units 10 of three different colors; the sub-pixel units 10 of the three different colors that are adjacent and arranged in sequence are used as a repeating unit; and the repeating unit is repeatedly arranged in the row direction in any row of sub-pixel units 10. In a non-rectangular touch display substrate, in a situation where it needs to retract the distance of the several sub-pixel units 10, the sub-pixel units 10 is retracted by the distance of an integer multiple of 3, for example. For the display substrate including only sub-pixel units 10 of two different colors in the same row, sub-pixel units 10 is retracted by the distance of an integer multiple of 2 is, for example.

For example, the color of each sub-pixel unit 10 is different from the color of the sub-pixel unit 10 adjacent to the each sub-pixel unit 10, so that the arrangement of the sub-pixel units 10 is facilitated in a situation where the sub-pixel units 10 of the three different colors are included in the same row.

For example, the sub-pixel units 10 of only two different colors are provided between any two adjacent data lines 20.

For example, a same pixel unit includes six sub-pixel units (such as the six sub-pixel units in the dotted line box in FIG. 1), so that it is suitable for forming a UHD (ultra high definition) display device. The smaller the distance between adjacent data lines 20, the more pixel units in a unit area. By reducing the distance between the adjacent data lines 20, the PPI (pixel per inch) of the touch display substrate is increased.

For example, each data line 20 is connected with the pixel unit switches 11 of the sub-pixel units 10 of the same color, which facilitates column-inversion in displaying a monochrome picture.

As shown in FIG. 1, each data line 20 is connected with only the pixel unit switches 11 of the sub-pixel units 10 which are of the same color and are located on the two sides of the data line 20. In this way, in displaying the monochrome picture, only the data lines 20 connected with the sub-pixel units 10 which are corresponding to the color to be displayed need to be turned on, for example, only the S1 and S4 data lines 20 need to be turned on in displaying a red picture, which is simple to implement and convenient to operate.

Figure 6:
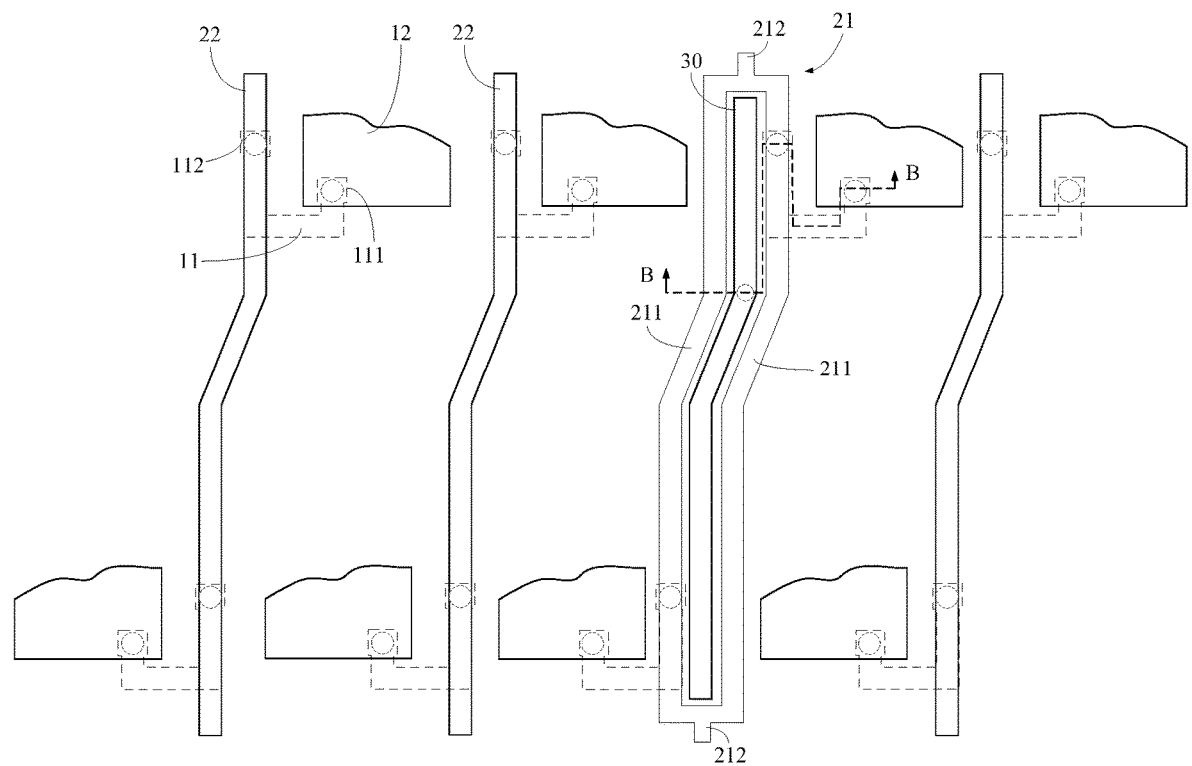
FIG. 6 is another partial plan view of the touch display substrate provided by the embodiments of the present disclosure.
Figure 7:
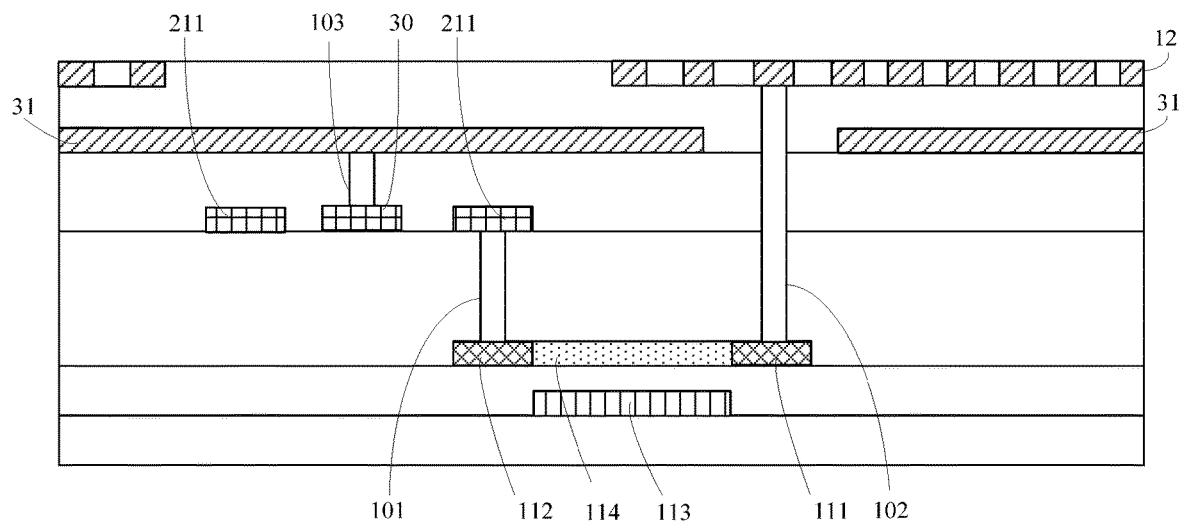
FIG. 7 is a schematic cross-sectional view taken along line B-B in FIG. 6.

FIG. 6 is another partial structural schematic view of the touch display substrate provided by the embodiments of the present disclosure, and FIG. 7 is a cross-sectional schematic view at B-B in FIG. 6. As shown in FIGS. 6 and 7, in the touch display substrate, the first data line 21 includes a convergence line 212 and two branch lines 211 both connected with the convergence line 212, the touch signal line 30 is located between the two branch lines 211, one of the two branch lines 211 is connected with the pixel unit switches 11 located on the first side of the touch signal line 30, the other of the two branch lines 211 is connected with the pixel unit switches 11 located on the second side of the touch signal line 30, and the first side and the second side are the opposite sides of the touch signal line 30. By providing the first data line 21 with the two branch lines 211, each of the two branch lines 211 is connected with only the pixel unit switches 11 on one side of the touch signal line 30, and this prevents the touch signal line 30 from crossing the pixel unit switch 11.

As shown in FIG. 6, the two branch lines 211 has a same extending direction, two ends of one branch line 211 are respectively connected with two ends of the other branch line 211 to form a closed frame structure, and the touch signal line 30 is located inside the frame structure. Two convergence lines 212 are connected with the frame structure. Because the touch signal line 30 is located inside the frame structure, a via hole needs to be provided to lead out the touch signal line 30.

In the touch display substrate shown in FIG. 2, each touch signal line 30 and each data line have the same extending direction, and the distance between the touch signal line 30 and the data line 20 closest to the touch signal line 30 is equal everywhere. In this way, it is convenient to set the data line 20 and the touch signal line 30, and meanwhile the case of local accumulation of charge caused by the small local distance between the data line 20 and the touch signal line 30 is avoided. For example, the extending direction of the first data line 21 is the same as the extending direction of the touch signal line 30, and the distance between the first data line 21 and the touch signal line 30 is equal everywhere. In addition, in the touch display substrate shown in FIG. 2, because the data line 20 does not have branches, the area of the orthographic projection of the data line 20 on the base substrate 1 is smaller, which is advantageous for increasing the aperture ratio of the pixel units and reducing the power consumption of the display substrate under a same brightness of the display substrate. Compared with the touch display substrate shown in FIG. 4, the aperture ratio of the touch display substrate shown in FIG. 2 is increased by 20%; through experimental tests, in a situation where the same monochrome picture is displayed and the brightness is the same, the power consumption of the touch display substrate shown in FIG. 2 is about 20% lower than that of the touch display substrate shown in FIG. 4.

The embodiments of the present disclosure further provides a display device, which includes the touch display substrate shown in any one of FIGS. 1 to 7. For example, the display device may be any product or component with a display function such as a mobile phone, a tablet computer, a television, a display, a notebook computer, a digital photo frame, a navigator, etc.

By arranging the touch signal line and the data line which are in the same layer, the parasitic capacitance between the data line and the touch signal line is reduced, the insulating layer between the data line and the touch signal line is omitted, and the process is simplified. Meanwhile, the touch signal line and the data line are insulated from each other to avoid the short circuit between the touch signal line and the data line.

Figure 8:
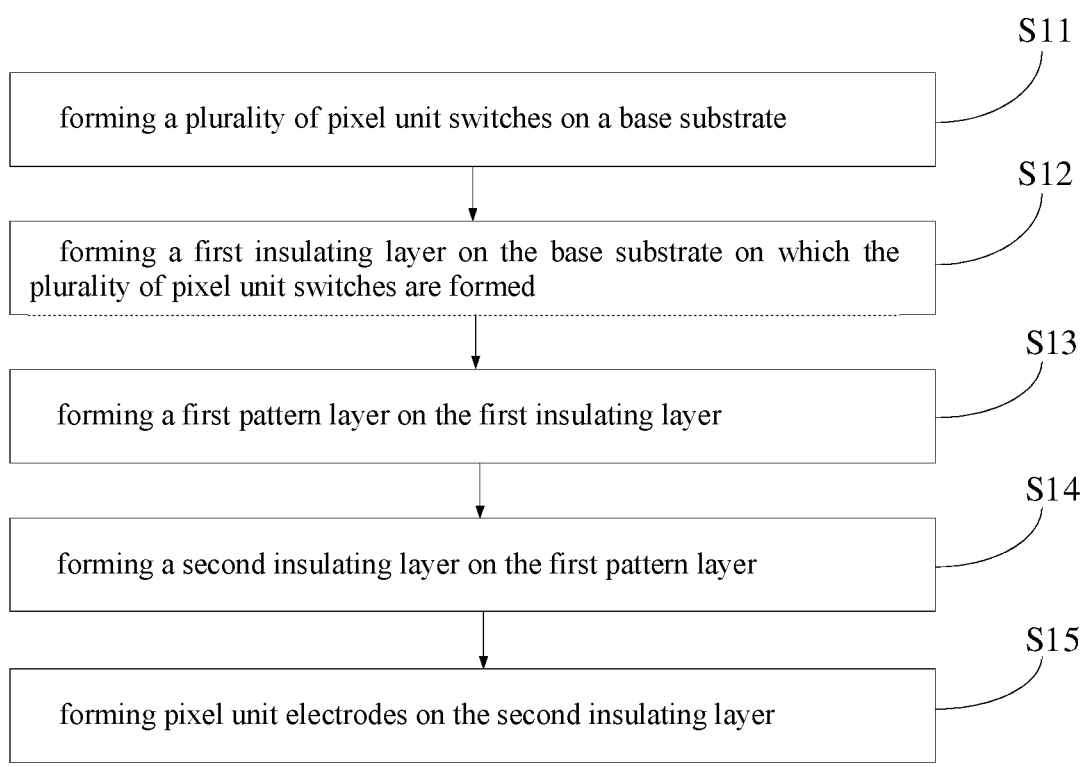
FIG. 8 is a flow chart of a manufacturing method of the touch display substrate according to the embodiments of the present disclosure.

FIG. 8 is a flow chart of a manufacturing method of the touch display substrate provided by the embodiments of the present disclosure. The method is suitable for manufacturing the touch display substrate shown in any one of FIGS. 1 to 7. As shown in FIG. 8, the manufacturing method includes the following steps.

S11: forming the plurality of pixel unit switches on the base substrate.

The pixel unit switches belong to different sub-pixel units, respectively. The sub-pixel units in each row of sub-pixel units are aligned; for any two adjacent rows of sub-pixel units, the sub-pixel units in one row of sub-pixel units are staggered in a row direction with respect to the sub-pixel units in the other row of sub-pixel units adjacent to the one row of sub-pixel units by a distance of X sub-pixel units 10, and 0<X<1. For example, X is 0.5. For the any two adjacent rows of sub-pixel units, the sub-pixel unit in the one row of sub-pixel units has a color different from that of the sub-pixel unit, which is adjacent to this sub-pixel unit and is in the other row of sub-pixel units.

S12: forming the first insulating layer on the base substrate on which the plurality of pixel unit switches are formed.

S13: forming a first pattern layer on the first insulating layer.

The first pattern layer includes the data lines and the touch signal lines spaced apart from each other. For example, the data line is connected with the pixel unit switches of the sub-pixel units located in different rows. For example, the data line is connected with the pixel unit switches of the sub-pixel units which are located on the two sides of the data line in the row direction and are located in the different rows.

S14: forming the second insulating layer on the first pattern layer.

S15: forming the pixel unit electrodes on the second insulating layer.

The pixel unit electrodes are all connected with the pixel unit switches, respectively.

By arranging the touch signal line and the data line which are in the same layer, the parasitic capacitance between the data line and the touch signal line is reduced, the insulating layer between the data line and the touch signal line is omitted, and the process is simplified. Meanwhile, the touch signal line and the data line are insulated from each other to avoid the short circuit between the touch signal line and the data line.

Figure 9:
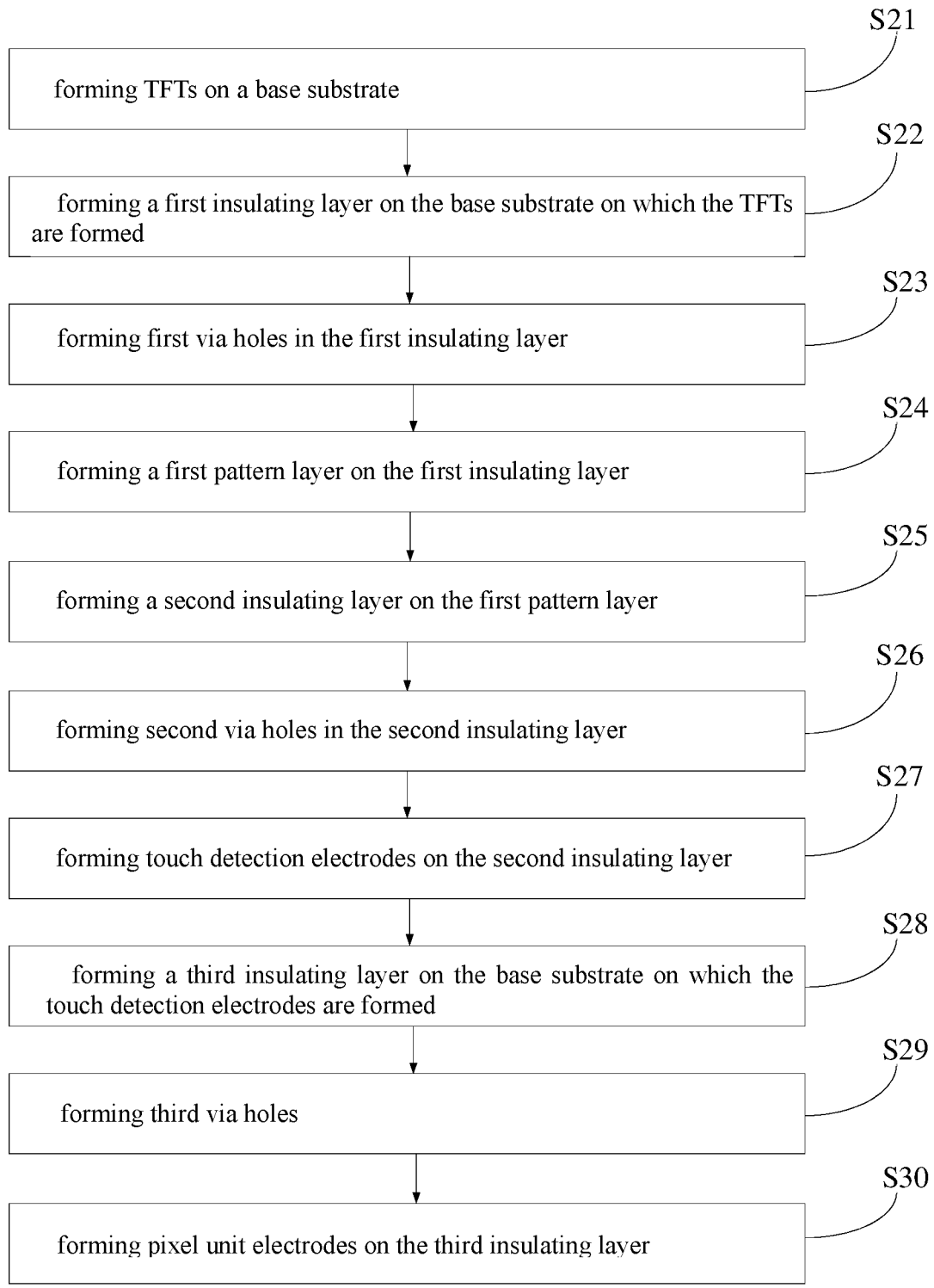
FIG. 9 is another flow chart of the manufacturing method of the touch display substrate provided by the embodiments of the present disclosure.

FIG. 9 is another flow chart of the manufacturing method of the touch display substrate provided in the embodiments of the present disclosure. The method is also applicable to manufacturing the touch display substrate shown in FIGS. 1 to 3. The manufacturing method will be described in detail below with reference to FIGS. 10 to 16. As shown in FIG. 9, the manufacturing method includes the following steps.

S21: forming TFTs on the base substrate.

Figure 10:
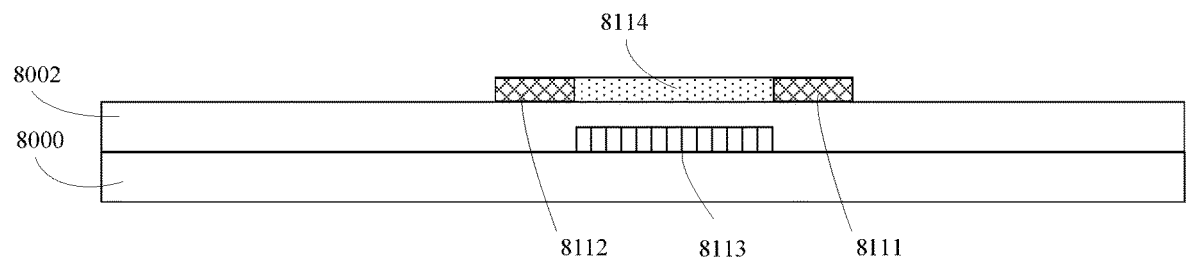
FIGS. 10 to 22 are schematic views of the manufacturing process of the touch display substrate according to the embodiments of the present disclosure.

For example, top gate type TFTs or bottom gate type TFTs are formed on the base substrate. As shown in FIG. 10, the bottom gate type TFT is formed on the base substrate 8000. The TFT includes a gate electrode 8113 provided on the base substrate 8000, a gate insulating layer 8002 provided on the gate electrode 8113, and an active layer provided on the gate insulating layer 8002. The active layer has a drain region 8111 and a source region 8112 spaced apart from each other and a channel region 8114 located between the drain region 8111 and the source region 8112. Orthographic projections of both the drain region 8111 and the source region 8112 on the base substrate 8000 are located outside an orthographic projection of the gate electrode 8113 on the base substrate 8000.

The plurality of TFTs are arranged in an array on the base substrate 8000 to meet the arrangement mode of the sub-pixel units of the touch display substrate to be manufactured.

For example, the low-temperature polysilicon type TFTs are used.

S22: forming the first insulating layer on the base substrate on which the TFTs are formed.

For example, the material of the first insulating layer 8010 includes nitride or nonmetallic oxide, the nitride includes but is not limited to SiNx, and the nonmetallic oxide includes but is not limited to SiOx.

S23: forming first via holes in the first insulating layer.

Figure 11:
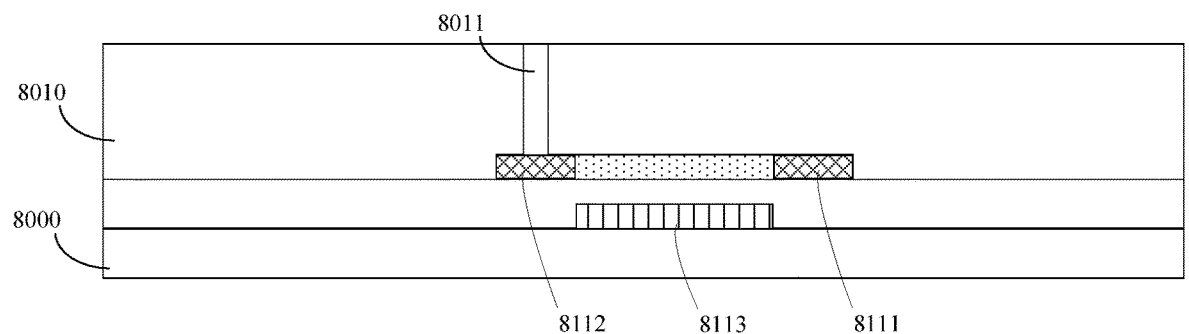

As shown in FIG. 11, the first via hole 8011 passes through the first insulating layer 8010 and is located directly above the source region 8112 of the TFT, so that the data line formed in the subsequent step is electrically connected with the source region 8112 through the first via hole 8011.

For example, the first via holes 8011 are formed by patterning the first insulating layer 8010.

S24: forming a first pattern layer on the first insulating layer.

For example, the first pattern layer is formed by a patterning process.

Figure 12:
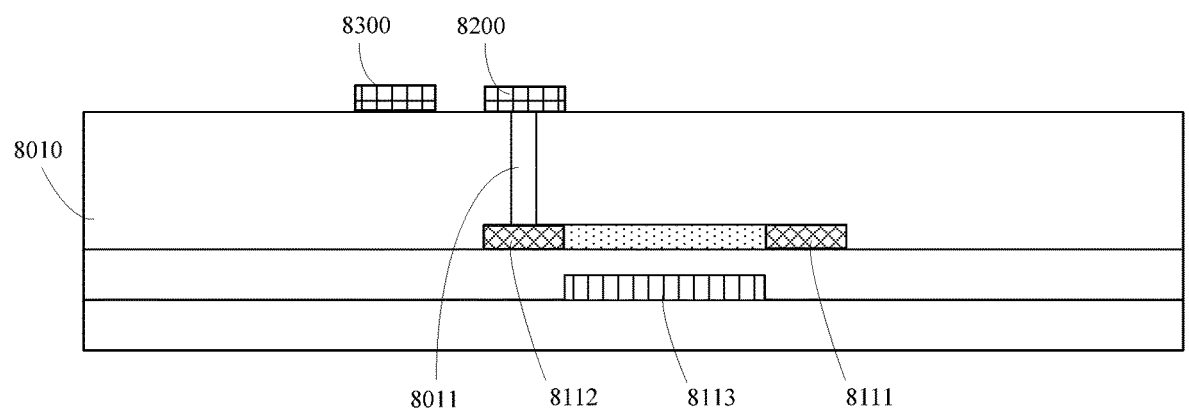

For example, as shown in FIG. 12, the first pattern layer includes a plurality of data lines 8200 and a plurality of touch signal lines 8300 that are spaced apart from the data lines 8200. The data line 8200 is located directly above the first via hole 8011 so that the data line 8200 is electrically connected with the source region 8112 of the TFT through the first via hole 8011.

For example, the data line 8200 and the touch signal line 8300 are formed of a metal material such as metal Al, or is formed of a transparent conductive material such as ITO (indium tin oxide).

In manufacturing the touch display substrate shown in FIG. 6, the first data line includes the convergence line and the two branch lines both connected with the convergence line, the touch signal line is located between the two branch lines, one of the two branch lines is connected with the source region of the TFT located on the first side of the touch signal line through a first via hole, the other of the two branch lines is connected with the source region of the TFT located on the second side of the touch signal line through another first via hole, and the first side and the second side are opposite sides of the touch signal line.

S25: forming the second insulating layer on the first pattern layer.

For example, the material of the second insulating layer 8020 is, but is not limited to, resin.

S26: forming second via holes in the second insulating layer.

The manufacturing method of the second via holes and the manufacturing method of the first via holes are same, for example.

Figure 13:
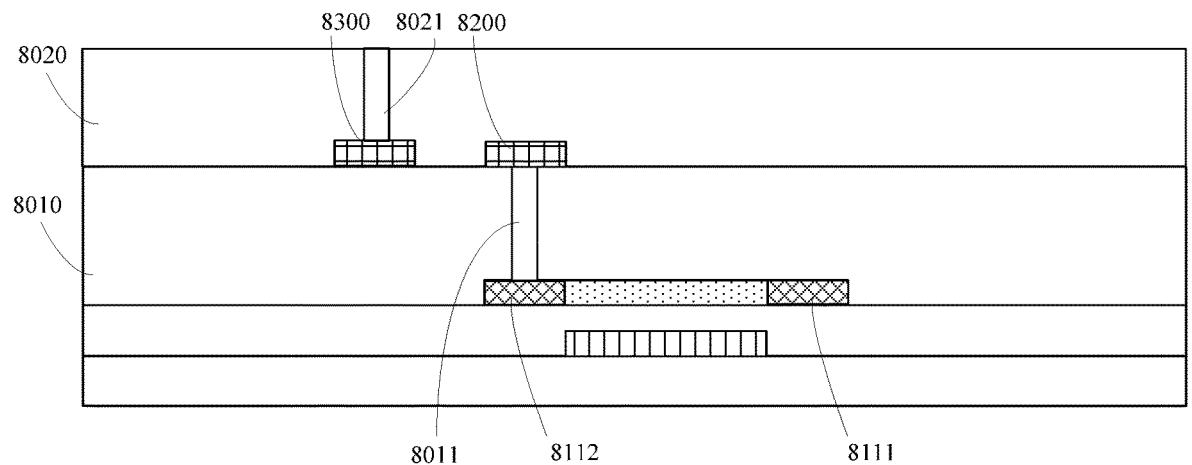

As shown in FIG. 13, the second via hole 8021 passes through the second insulating layer 8020 and is located directly above the touch signal line 8300, so that the touch detection electrode manufactured in the subsequent steps is connected with the touch signal line 8300 through the second via hole 8021.

S27: forming the touch detection electrodes on the second insulating layer.

For example, the touch detection electrodes are formed by a patterning process.

Figure 14:
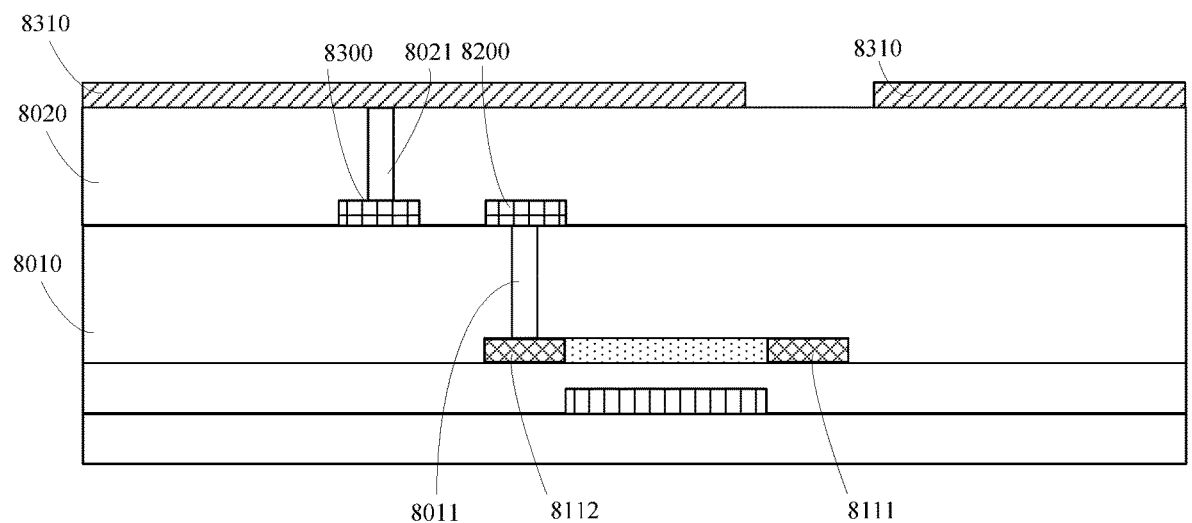

As shown in FIG. 14, the touch detection electrode 8310 is electrically connected with the touch signal line 8300 through the second via hole 8021.

For example, the touch detection electrodes 8310 are formed of a transparent conductive material, such as ITO, to increase light transmittance.

S28: forming the third insulating layer on the base substrate on which the touch detection electrodes are formed.

For example, the material of the third insulating layer 8030 is silicon nitride, and the thickness of the third insulating layer 8030 is from 100 nm to 200 nm.

S29: forming third via holes.

Figure 15:
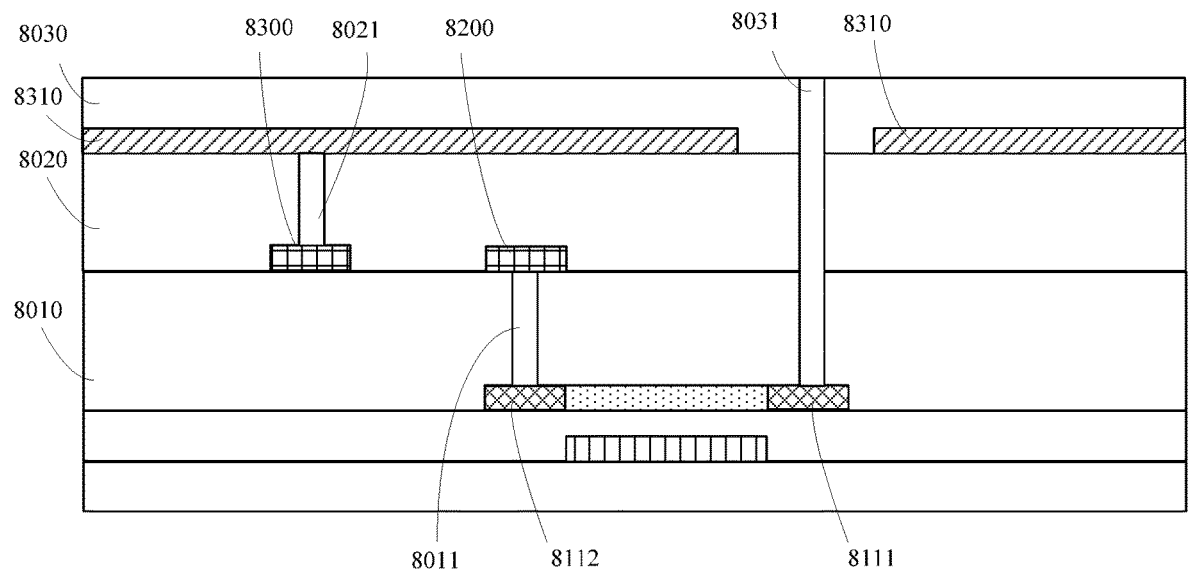

As shown in FIG. 15, the third via hole 8031 is located directly above the drain region 8111 of the TFT, and the third via hole 8031 passes through the third insulating layer 8030, the second insulating layer 8020 and the first insulating layer 8010, to facilitate the subsequent-formed pixel unit electrode to be electrically connected with the drain region 8111.

S30: forming the pixel unit electrodes on the third insulating layer.

For example, the pixel unit electrodes 8120 are formed by a patterning process.

Figure 16:
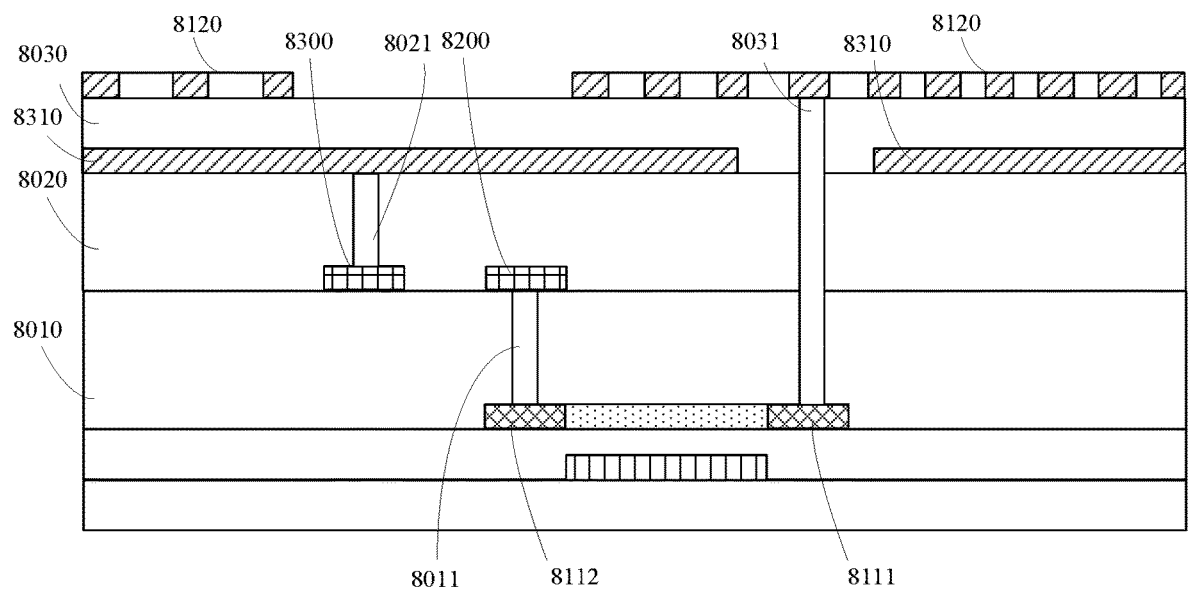

As shown in FIG. 16, the pixel unit electrode 8120 is electrically connected with the drain region 8111 through the third via hole 8031.

For example, the pixel unit electrodes 8120 are formed of a transparent conductive material such as ITO to increase light transmittance.

Figure 17:
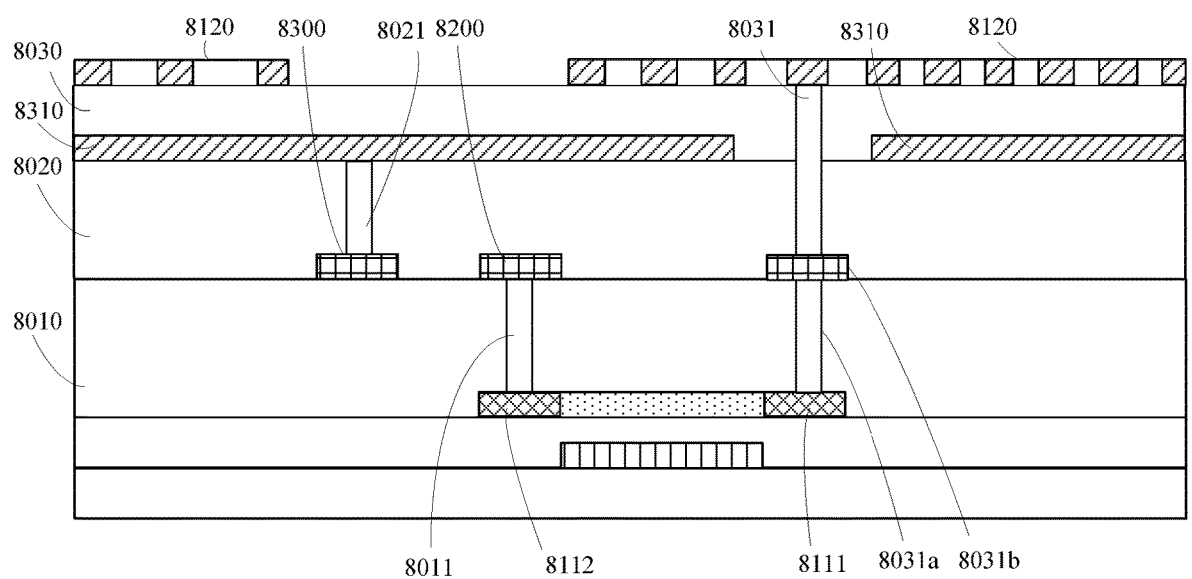

For example, in a situation where the step S23 is performed, a via hole is formed in the first insulating layer 8010 and is directly above the drain region 8111. In this way, in a situation where the step S24 is performed, in forming the data line 8200 and the touch signal line 8300, a transition electrode is formed on the first insulating layer 8010, and the transition electrode is electrically connected with the drain region 8111 through the via hole located directly above the drain region 8111 in the first insulating layer 8010. As shown in FIG. 17, by simultaneously manufacturing the via hole 8031a in the step S23 and the transition electrode 8031b in the step S24, the third via hole 8031 to be processed in the S29 can pass through only the third insulating layer 8030 and the second insulating layer 8020, thus reducing the depth of the third via hole 8031, reducing the process difficulty, ensuring that the pixel unit electrode 8120 can form a stable electrical connection with the drain region 8111, and reducing the possibility of open circuit and poor contact. At the same time, because the via hole 8031a is formed at the same time as the first via hole 8011, the transition electrode 8031b is formed at the same time as the touch signal line 8300 and the data line 8200 without adding an additional process step.

Figure 18:
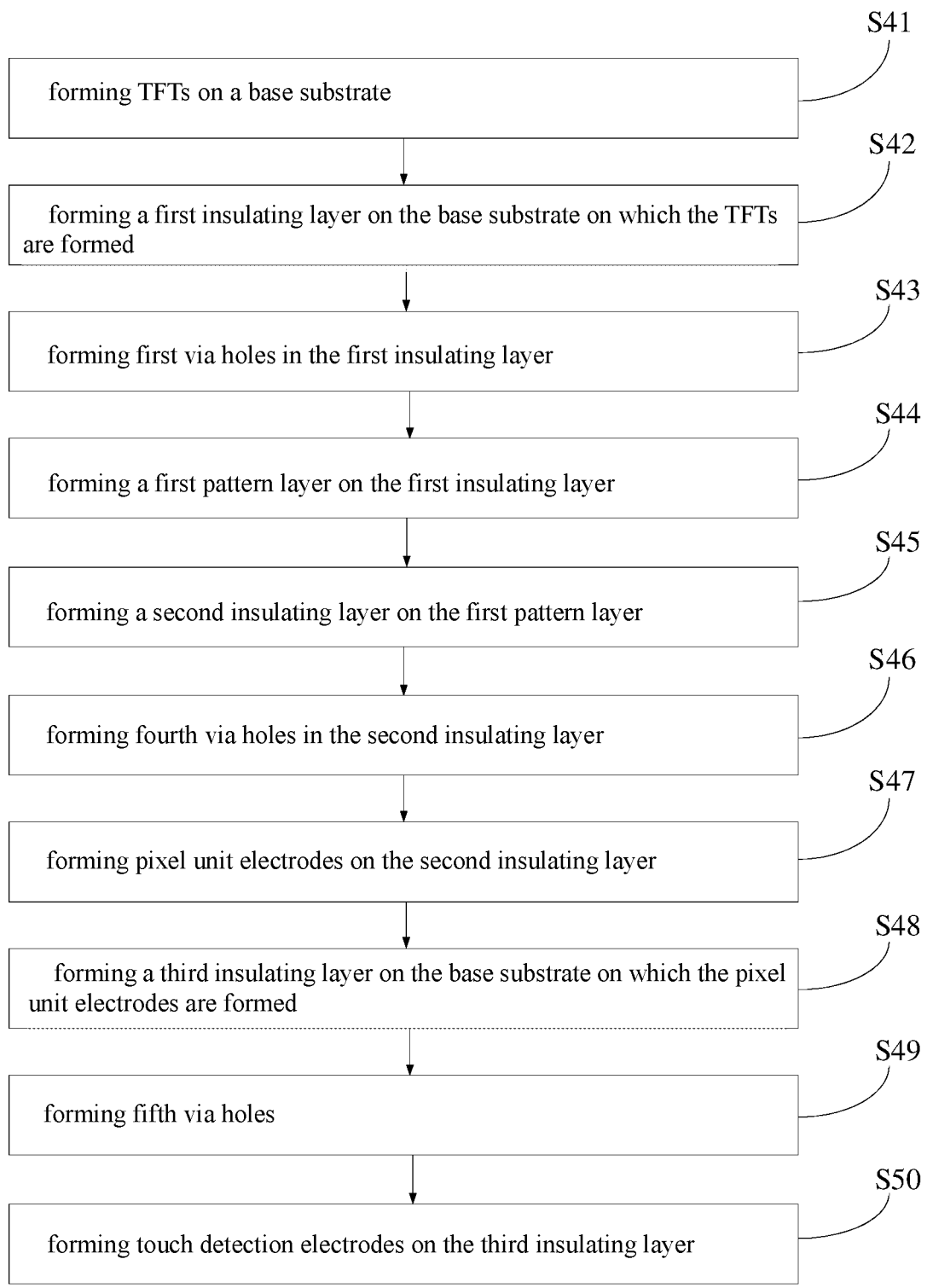

FIG. 18 is another flow chart of the manufacturing method of the touch display substrate provided by the embodiments of the present disclosure. The method is used for manufacturing the touch display substrate shown in FIG. 4. The manufacturing method includes S41 to S50, and steps S41 to S45 are respectively the same as the aforementioned steps S21 to S25, and will not be described in detail here. Steps S46 to S50 of the method will be described below with reference to FIGS. 19 to 21.

S46: forming fourth via holes in the second insulating layer.

The manufacturing method of the fourth via holes 9021 is the same as that of the second via holes 8021 described above.

Figure 19:
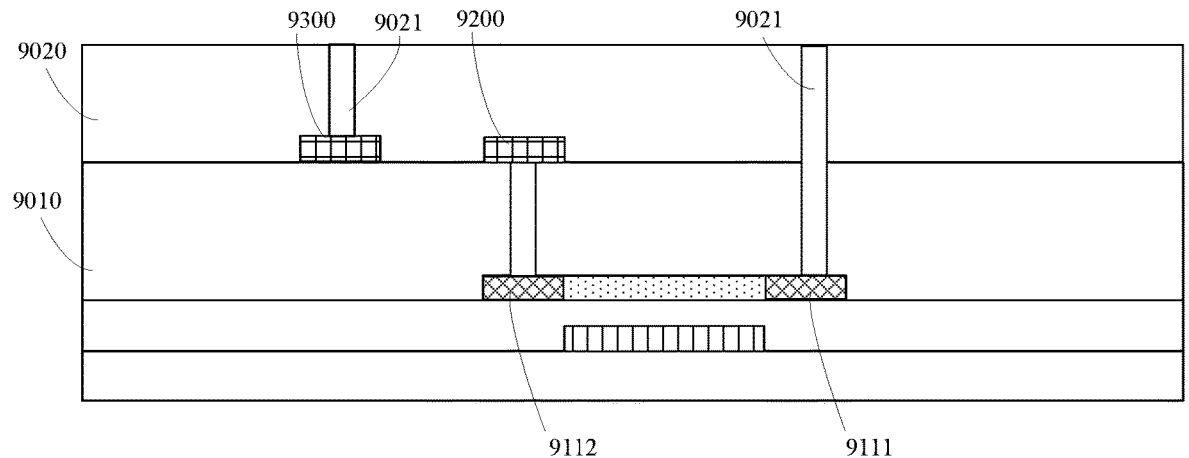

As shown in FIG. 19, the fourth via hole 9021 is located directly above the drain region 9111 of the TFT, and the fourth via hole 9021 passes through the second insulating layer 9020 and the first insulating layer 9010, to facilitate the subsequently-formed pixel unit electrode to be electrically connected with the drain region 9111.

S47: forming the pixel unit electrodes on the second insulating layer.

For example, the pixel unit electrodes 9120 are formed by a patterning process.

Figure 20:
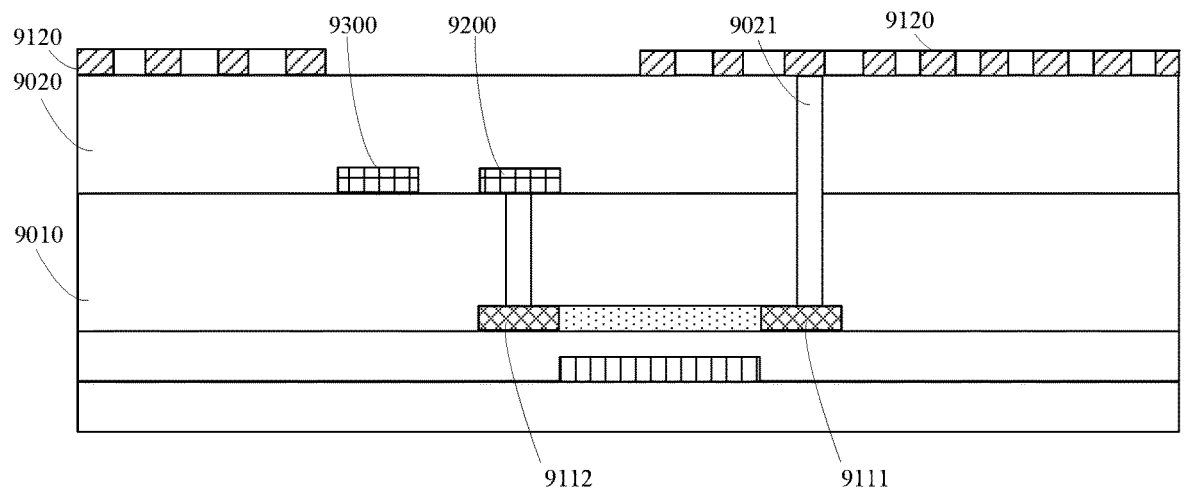

As shown in FIG. 20, the pixel unit electrode 9120 is electrically connected with the drain region 9111 through the fourth via hole 9021.

S48: forming the third insulating layer on the base substrate on which the pixel unit electrodes are formed.

For example, the forming of the third insulating layer 9030 may refer to the forming of the aforementioned third insulating layer 8030 and will not be described in detail here.

S49: forming fifth via holes.

Figure 21:
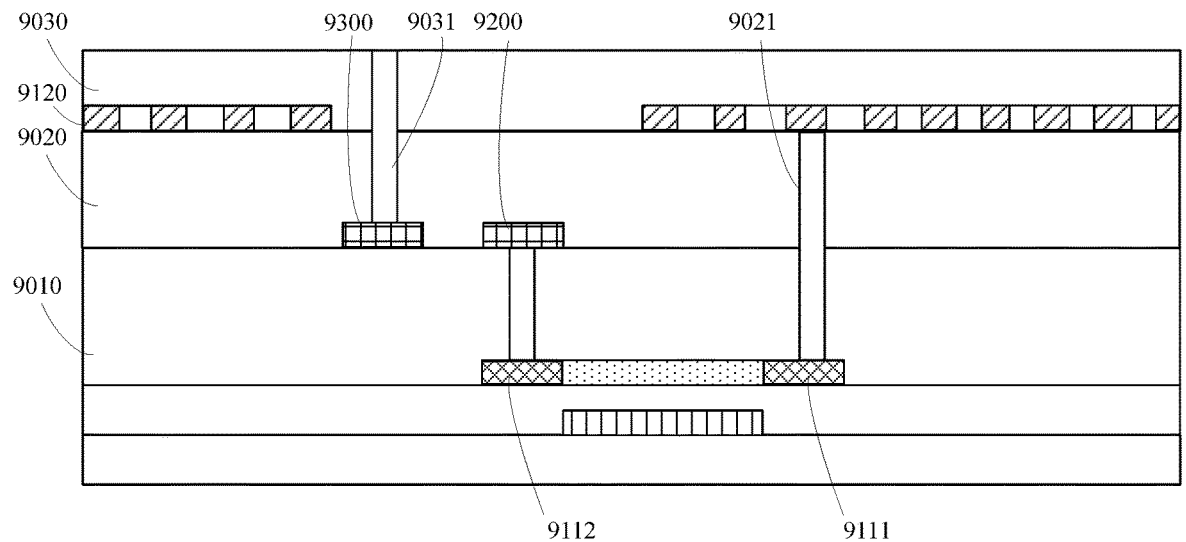

As shown in FIG. 21, the fifth via hole 9031 is formed directly above the touch signal line 9300, and the fifth via hole 9031 passes through the third insulating layer 9030 and the second insulating layer 9020, so that the touch detection electrode formed in the subsequent step is connected with the touch signal line 9300 through the fifth via hole 9031.

S50: forming the touch detection electrodes on the third insulating layer.

For example, the touch detection electrodes 9030 are formed by a patterning process.

Figure 22:
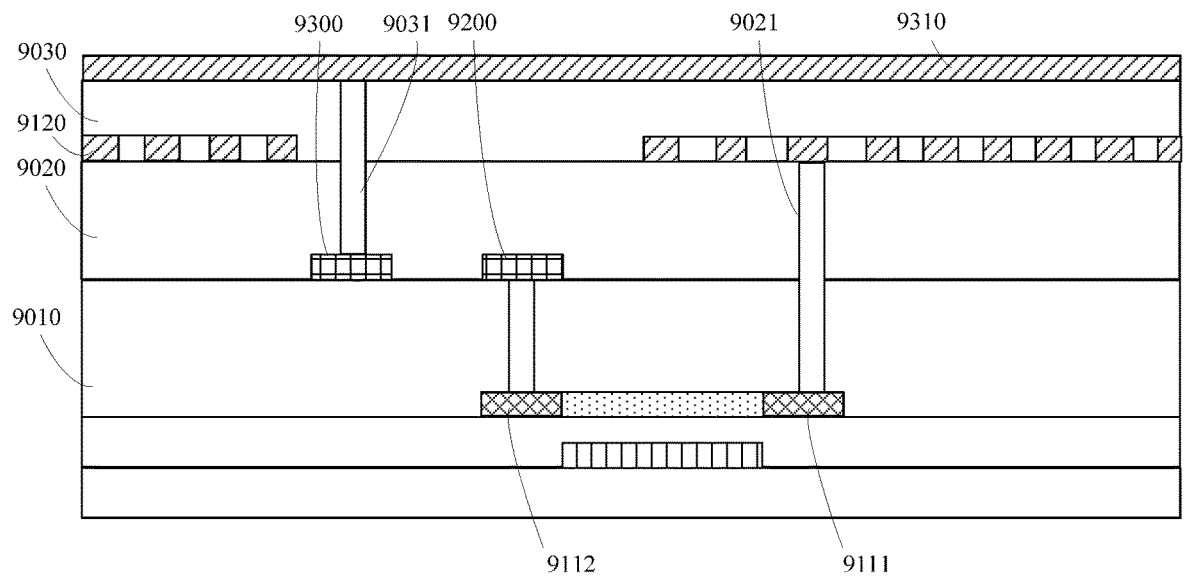

As shown in FIG. 22, the touch detection electrode 9030 is connected with the touch signal line 9300 through the fifth via hole 9031.

In manufacturing the touch display substrate shown in FIG. 4, the aforementioned method of adding the transition electrode can also be used to reduce the possibility of open circuit and poor contact, which will not be described in detail here.

What is described above is related to the illustrative embodiments of the disclosure only and not limitative to the scope of the disclosure; the scopes of the disclosure are defined by the accompanying claims.

What is claimed is:

1. A touch display substrate, comprising:
   a plurality of sub-pixel units, arranged in an array, each of the plurality of sub-pixel units comprising a pixel unit switch;
   data lines, each of the data lines arranged at a gap between two adjacent columns of the plurality of sub-pixel units; and
   touch signal lines, each of the touch signal lines arranged at the gap between the two adjacent columns of the plurality of sub-pixel units and has a bend shape,
   wherein the data lines comprise a first data line, and the touch signal line is at the gap, where the first data line is located, extending in a column direction,
   wherein the data lines further comprise a second data line, and the touch signal line is not at the gap, where the second data line is located, extending in the column direction, and
   wherein two of the data lines closest to a same touch signal line comprise the first data line and the second data line, a first distance is from the same touch signal line to the second data line of the two of the data lines in a row direction, a second distance is from the first data line of the two of the data lines to another second data line closest to the first data line of the two of the data lines in the row direction, and the first distance is equal to the second distance.

2. The touch display substrate according to claim 1, wherein:
each of the plurality of sub-pixel units further comprises: a touch detection electrode, the touch detection electrode is electrically connected with the touch signal line through a first via hole;
the pixel unit switch comprises an active layer, the active layer comprises a source region, a drain region and a channel region between the source region and the drain region, the source region is electrically connected with the data line through a second via hole;
each of the plurality of sub-pixel units further comprises: a pixel unit electrode, and the drain region is electrically connected with the pixel unit electrode through a third via hole; and
the first via hole, the second via hole and the third via hole which are located in a same sub-pixel unit are not arranged in a straight line.

3. The touch display substrate according to claim 2, wherein:
the first via hole and the second via hole located in the same sub-pixel unit are not arranged in a straight line along the row direction; and
the second via hole is closer to the pixel unit electrode than the first via hole in the row direction.

4. The touch display substrate according to claim 2, wherein:
the touch detection electrode is further configured to be used as a common electrode and the common electrode has a plate shape;
the pixel unit electrode is on a side of the touch detection electrode away from a base substrate and has a plurality of slits.

5. The touch display substrate according to claim 4, wherein:
the common electrode is electrically connected with the touch signal line through the first via hole;
the pixel unit electrode is electrically connected with the drain region through the third via hole;
an orthographic projection of the third via hole on the common electrode is non-overlapped with the common electrode.

6. The touch display substrate according to claim 5, wherein the pixel unit switch is a top-gate type thin film transistor, the channel region is between the base substrate and a gate electrode of the top-gate type thin film transistor in a direction perpendicular to the base substrate.

7. The touch display substrate according to claim 1, wherein:
each of the touch signal lines is bent between a first row of sub-pixel units and a second row of sub-pixel units;
each of the data lines is bent between the first row of sub-pixel units and the second row of sub-pixel units; and
the first row of sub-pixel units and the second row of sub-pixel units are adjacent to each other.

8. The touch display substrate according to claim 7, wherein:
each of the touch signal lines comprises a first straight-line section, and each of the data lines comprises a second straight-line section, the first straight-line section and the second straight-line section are parallel to each other.

9. The touch display substrate according to claim 1, wherein the touch signal lines and the data lines are in a same layer.

* * * * *